US012657139B2

(12) United States Patent
Becht et al.

(10) Patent No.: US 12,657,139 B2
(45) Date of Patent: Jun. 16, 2026

(54) PARALLEL DATA READ OUT FROM BUFFER IN BUS PROTOCOL ENVIRONMENT

(71) Applicant: International Business Machines Corporation, Armonk, NY (US)

(72) Inventors: Michael James Becht, Poughkeepsie, NY (US); Aditi Desai, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 125 days.

(21) Appl. No.: 18/328,984

(22) Filed: Jun. 5, 2023

(65) Prior Publication Data

US 2024/0403239 A1      Dec. 5, 2024

(51) Int. Cl.
*G06F 13/16*      (2006.01)
*G06F 13/40*      (2006.01)

(52) U.S. Cl.
CPC ............................... *G06F 13/1673* (2013.01)

(58) Field of Classification Search
CPC ............................ G06F 13/1642; H04L 67/61
See application file for complete search history.

(56) References Cited

U.S. PATENT DOCUMENTS 5,003,465 A      3/1991  Chisholm et al.
5,179,669 A      1/1993  Peters

| 5,483,528 | A | * | 1/1996 | Christensen | ............ | H04M 9/02 |
| | | | | | | 370/263 |
| 7,581,038 | B1 | | 8/2009 | Lieberman et al. | | |
| 8,060,849 | B2 | | 11/2011 | He et al. | | |
| 11,893,241 | B1 | * | 2/2024 | Lilly | ..................... | G06F 3/0673 |
| 2003/0204653 | A1 | * | 10/2003 | Katayama | ........... | H04L 49/9052 |
| | | | | | | 710/52 |
| 2005/0132074 | A1 | * | 6/2005 | Jones | ...................... | H04L 67/10 |
| | | | | | | 709/225 |
| 2009/0217230 | A1 | * | 8/2009 | He | ......................... | G06F 30/398 |
| | | | | | | 716/129 |
| 2009/0327563 | A1 | * | 12/2009 | Greenblat | ......... | G06F 15/17393 |
| | | | | | | 710/305 |
| 2011/0246728 | A1 | * | 10/2011 | Maruyama | .......... | G06F 12/0215 |
| | | | | | | 711/E12.001 |
| 2014/0282510 | A1 | * | 9/2014 | Anderson | ........... | G06F 9/45558 |
| | | | | | | 718/1 |
| 2020/0234582 | A1 | * | 7/2020 | Mintz | .............. | G08G 1/096811 |
| 2020/0303017 | A1 | * | 9/2020 | Yamaoka | ............... | G11C 16/16 |
| 2021/0366374 | A1 | * | 11/2021 | Wei | ....................... | G09G 3/2085 |
| 2022/0083369 | A1 | * | 3/2022 | Snyder | ................ | G06F 13/1642 |
| 2023/0058989 | A1 | * | 2/2023 | Hammarlund | ........ | G06F 13/161 |

* cited by examiner

*Primary Examiner* — Getente A Yimer
(74) *Attorney, Agent, or Firm* — Teddi Maranzano, Esq.; Matthew M. Hulihan, Esq.; Heslin Rothenberg Farley & Mesiti P.C

(57) ABSTRACT

Embodiments herein describe assigning requests from hardware modules that are transmitted by a shared interconnect to destinations (e.g., workers) in the same integrated circuit (IC) into groups. For example, the destinations can be assigned into respective groups. When a request is received, a group classifier can use the destination address in the request to identify its group. The request can be stored in a request buffer, while the location of the request in the request buffer is stored in a group buffer. Each hardware module can include a request buffer and a group buffer for each group in the system.

20 Claims, 6 Drawing Sheets

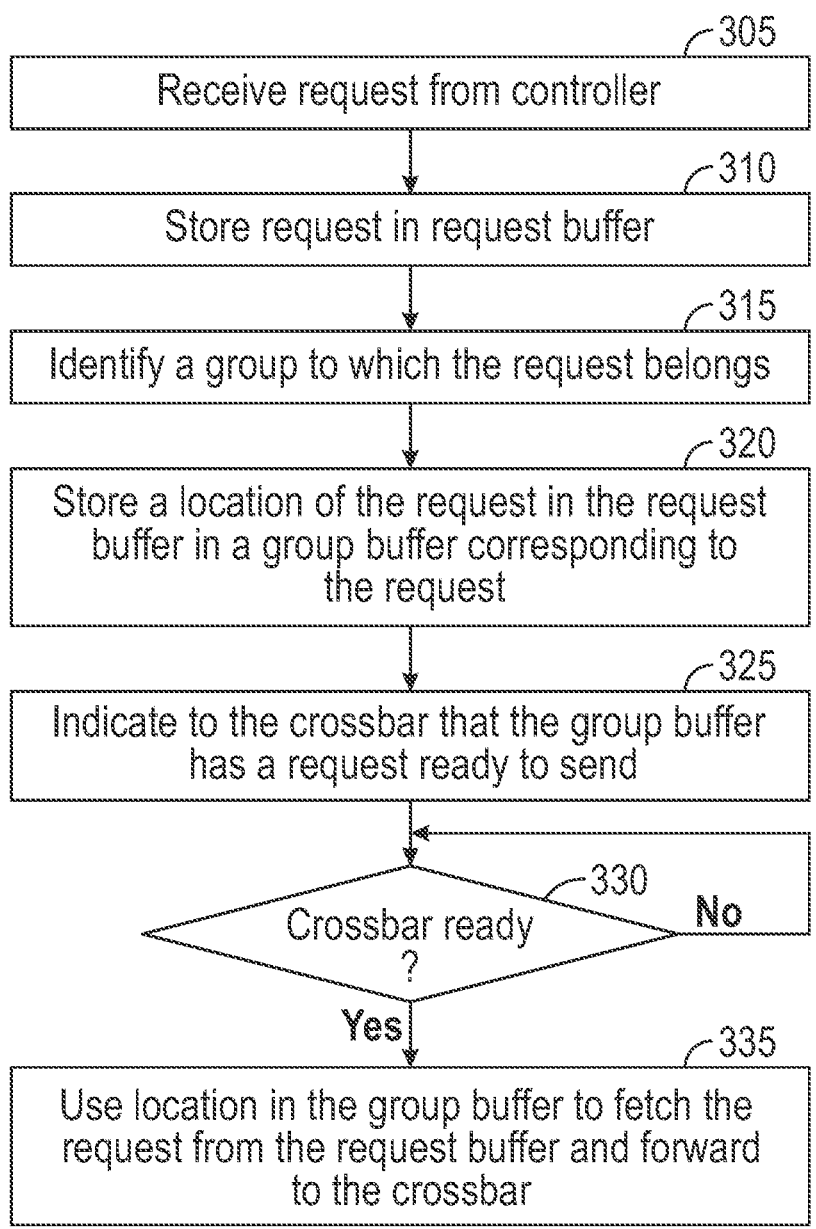

300

305
Receive request from controller

310
Store request in request buffer

315
Identify a group to which the request belongs

320
Store a location of the request in the request buffer in a group buffer corresponding to the request 325
Indicate to the crossbar that the group buffer has a request ready to send 330
Crossbar ready
?
No Yes 335
Use location in the group buffer to fetch the request from the request buffer and forward to the crossbar

FIG. 3

Predict, or measure, the number of requests a controller sends to worker destinations — 605

Assign the worker destinations to the groups based on the number of requests — 610

Configure the group classifier — 615

PARALLEL DATA READ OUT FROM BUFFER IN BUS PROTOCOL ENVIRONMENT

BACKGROUND

The present invention relates to interconnects in integrated circuits, and more specifically, to assigning destinations into groups.

Processors (e.g., central processing units (CPUs)) include interconnects for transmitting data between different hardware modules in the processor. Ideally, a hardware module will include an independent interconnect to each destination in the processor. However, space is always limited in an integrated circuit, and thus, providing independent interconnects for every hardware module to every destination is impossible.

Thus, processors typically include some kind of arbitration interconnect that is shared by the hardware modules. However, this means that if multiple hardware modules want to send data to the same destination at the same, they must wait while an arbiter selects each of the hardware modules sequentially. The hardware modules may collect multiple requests that are queued in its buffer while waiting for its turn to transmit data to the destination (e.g., head of line blocking). For example, the hardware module may have a request to a different destination that could be sent on the interconnect (because no other hardware modules are currently sending to that destination) but cannot because the hardware module is waiting for the previous request to be sent.

SUMMARY

According to one embodiment of the present invention, a method includes receiving a request from a source circuit in an integrated circuit (IC) to be forwarded to a destination circuit in the IC where the source circuit and the destination circuit are connected in the IC by a shared interconnect, storing the request in a request buffer, identifying a group to which the request belongs based on a destination address in the request where the IC comprises a plurality of destinations circuits coupled to the shared interconnect and the plurality of destination circuits are assigned to a plurality of groups, storing, in a group buffer for the identified group, a location of the request in the request buffer, indicating to the shared interconnect that the group buffer has a request ready to be sent, and after the shared interconnect is ready, using the location of the request stored in the group buffer to fetch the request from the request buffer and forward the request to the shared interconnect.

The method above also may include that the IC includes a plurality of source circuits that forward requests to the plurality of destination circuits where each of the plurality of source circuits include a request buffer and a plurality of group buffers and where a number of the plurality of group buffers equals a number of the plurality of groups. Advantageously, each source circuit can include a group buffer for each group so that requests for different groups are not blocked by other groups.

The method above also may include that each of the plurality of group buffers has a separate data path to the shared interconnect so that each of the plurality of group buffers can indicate to the shared interconnect, in parallel with other group buffers, that it has a request ready to send. Advantageously, each of the group buffers can communicate independently with the shared interconnect so that requests for different groups can be services in parallel.

The method above also may include the plurality of group buffers and the plurality of groups are assigned to sets of non-overlapping destination circuits in the IC where the shared interconnect can transmit requests to different ones of the plurality of groups in parallel. Advantageously, non-overlapping groups can be used to minimize head of line blocking.

The method above also may include where the shared interconnect is unable to send multiple requests assigned to a same group in parallel, but the shared interconnect can send requests assigned to different ones of the plurality of groups in parallel. Advantageously, such a shared interconnect permits requests for different groups to be done in parallel, but while using much less real estate in the IC than would be needed in order to permit hardware to transmit to the same group in parallel.

The method above also includes entries in the request buffer can be written into, and read from, in any order. Advantageously, this permits previously received requests for groups that are currently blocked by the shared interconnect to not prevent subsequently received requests for different groups to be transmitted on the shared interconnect.

According to one embodiment of the present invention, an IC includes a plurality of source circuits, a plurality of destination circuits, a shared interconnect coupled to the plurality of source circuits and the plurality of destination circuits where a first source circuit is configured to generate a request to be forwarded to a first destination circuit using the shared interconnect, a request buffer configured to store the request before it is forwarded by the shared interconnect, a group classifier circuit configured to identify a group to which the request belongs based on a destination address in the request, and a group buffer assigned to the group, the group buffer configured to store a location of the request in the request buffer and indicate to the shared interconnect that the group buffer has a request ready to be sent where after the shared interconnect is ready, the group buffer is configured to use the location of the request to fetch the request from the request buffer and forward the request to the crossbar.

According to one embodiment of the present invention, an IC includes a plurality of source circuits, a plurality of destination circuits, a shared interconnect coupled to the plurality of source circuits and the plurality of destination circuits where each of the plurality of destination circuits are assigned to one of a plurality of groups, a respective request buffer for each of the plurality of source circuits where the respective request buffers are configured to store requests before the requests are forwarded by the shared interconnect to the plurality of destination circuits, a respective group classifier circuit for each of the plurality of source circuits where the respective group classifier circuits are configured to identify a group to which a request belongs based on a destination address in the request, and a plurality of group buffers for each of the plurality of source circuits where each one of the plurality of the group buffers is assigned to one of the plurality of groups and stores request data related only to its assigned group.

BRIEF DESCRIPTION OF THE DRAWINGS

FIG. 3 is a flowchart for assigning requests into groups, according to one embodiment.

DETAILED DESCRIPTION

Figure 1:
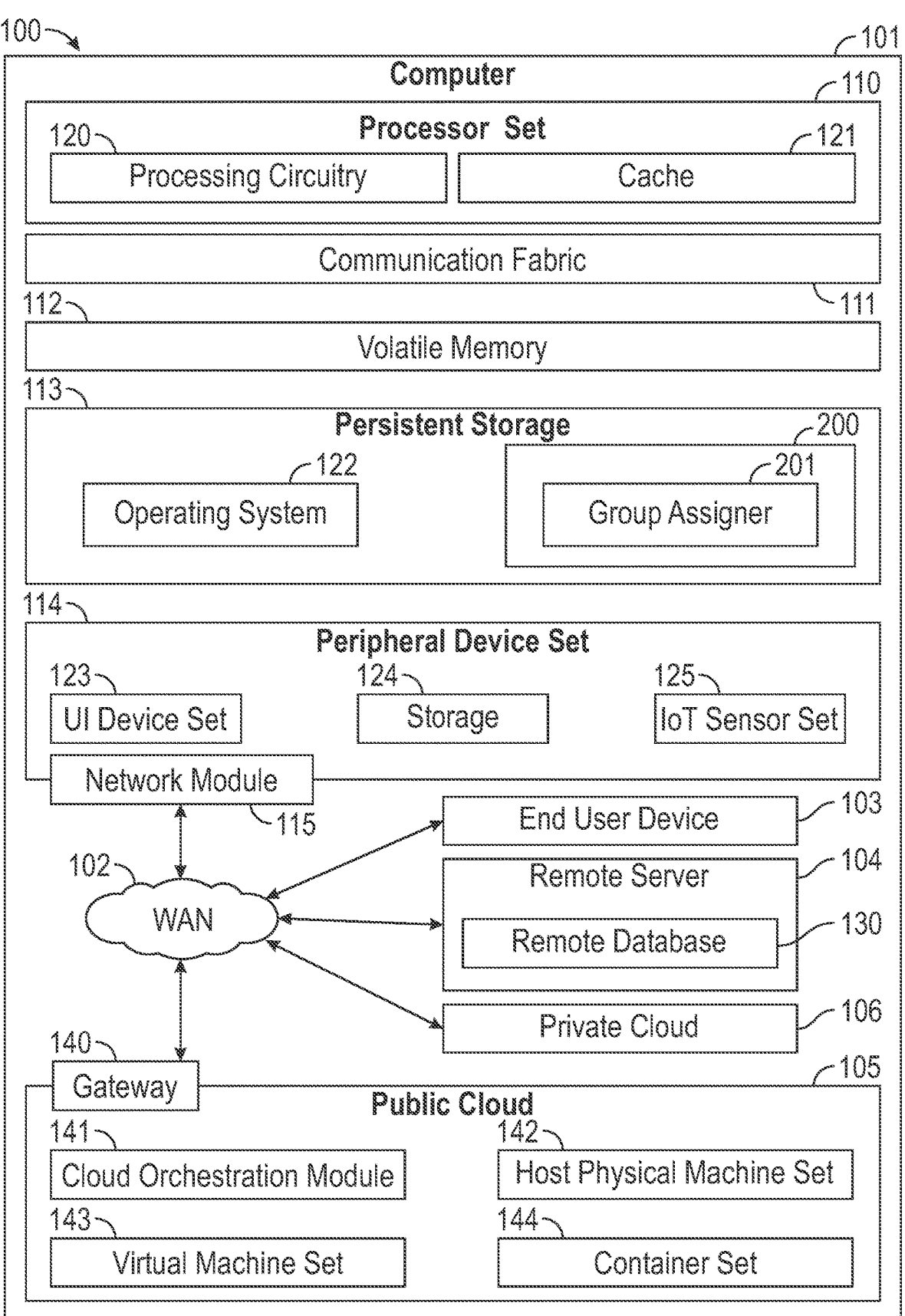
FIG. 1 is a block diagram of a computing environment, according to one embodiment.

Embodiments herein describe assigning requests from hardware modules that are transmitted by a shared interconnect to destinations in the same integrated circuit (IC) into groups. For example, the addresses of the destinations can be assigned into respective groups. When a request is received, a group classifier can use the destination address in the request to identify its group. The request can be stored in a request buffer, while the location of the request in the request buffer is stored in a group buffer. Each hardware module (e.g., each controller) can include a request buffer and a plurality group buffers, one for each group in the system.

When a group buffer detects a new request (assuming it was previously empty), the group buffer can inform the interconnect that it has a request is ready to be sent to a destination in that group. If the interconnect is currently sending data to that group on behalf of a different hardware module in the IC, the interconnect will not accept the request. However, if the interconnect is not currently sending data to that group, it will inform the group buffer, which can the instruct the request buffer to forward the request to the interconnect. Because each of the group buffers can have independent paths to the interconnect, this means that even if one group buffer cannot send (e.g., another hardware module is transmitting data to a destination in that group), the other groups can transmit their data on the interconnect. Put differently, the interconnect (e.g., a crossbar) can service multiple request in parallel, but those request have to be for different groups. Thus, if one request for a hardware module is blocked, other requests for the hardware module that are in other groups may still be able to be sent. This can mitigate head of line blocking.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as block 200 which includes a group assigner 201 (e.g., a software application) which intelligently assigns destinations in the processor IC into groups. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
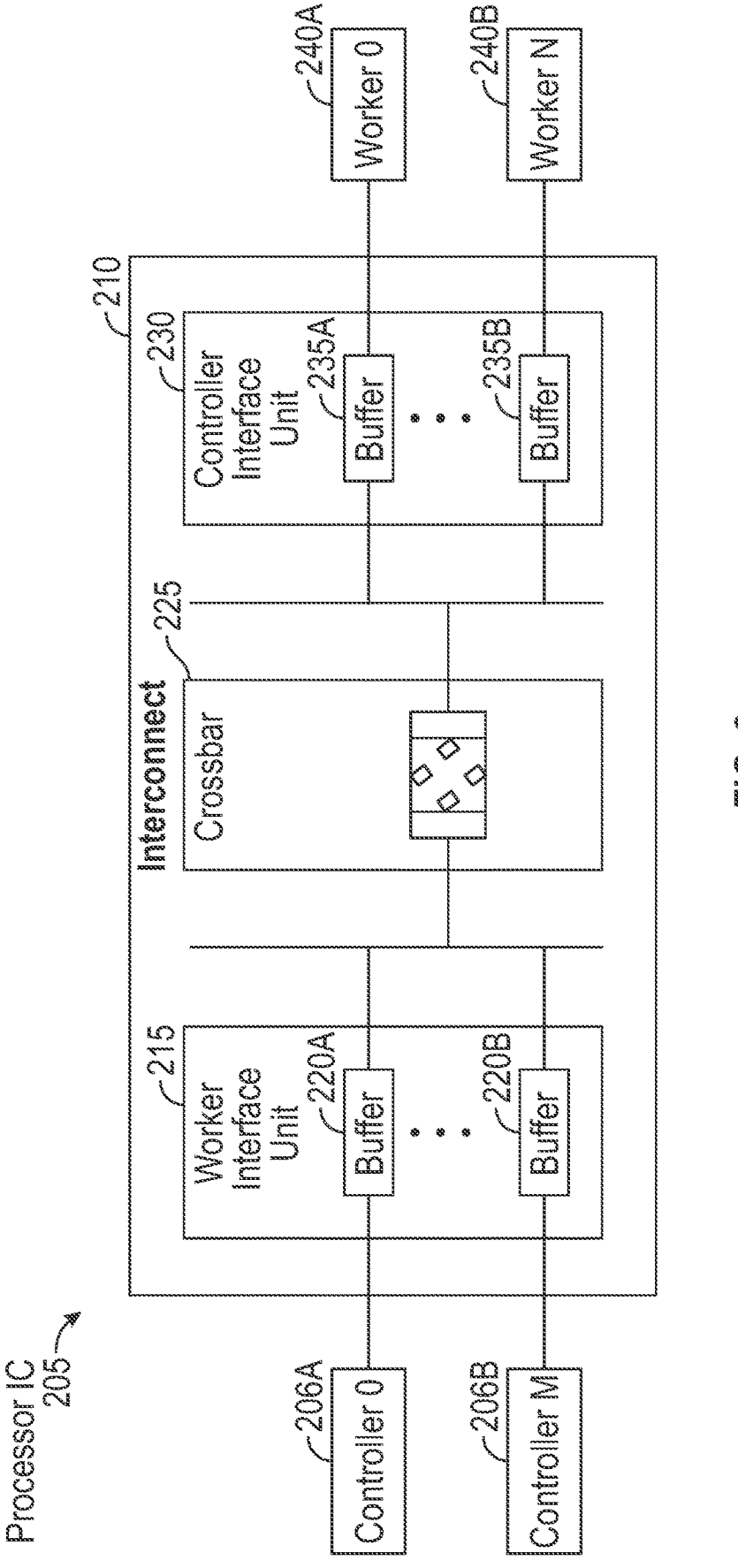
FIG. 2 illustrates an interconnect on a processor integrated circuit, according to one embodiment.

FIG. 2 illustrates an interconnect 210 on a processor IC 205, according to one embodiment. In one embodiment, the processor IC 205 is a CPU that can include one or more processor cores. While the embodiments below discuss a processor, the embodiments herein can be applied to any IC that has hardware modules that communicate via an interconnect. For example, the embodiments herein can be applied to application specific integrated circuits (ASICs), graphic processing units (GPUs), field programmable gate arrays (FPGAs), and the like.

The processor IC 205 includes controllers 206 (e.g., source circuits) that transmit requests to workers 240 (e.g., destination circuits) using the interconnect 210. In this example, the interconnect 210 includes a worker interface unit 215 that includes buffers 220 for storing the requests generated by the controllers 206. In one embodiment, the worker interface unit 215 includes a dedicated buffer 220 for each controller 206. These buffers 220 as also referred to as requests buffers.

The interconnect 210 includes a crossbar 225 that connects the request buffers 220 to buffers 235 in a controller interface unit 230. In one embodiment, the crossbar 225 can transmit multiple requests from multiple controllers 206 in parallel so long as the requests are to different destinations (e.g., different workers 240). For example, the crossbar 225 can transmit a request received from controller 206A to the worker 240A and a request received from controller 205B to the worker 240B in parallel. Or the crossbar 225 can transmit a first request received from the controller 206A to the worker 240A and a second request received from the controller 205A to the worker 240B in parallel. However, if both controllers 206A want to send respective request to the same worker 240 (or one controller 206 has multiple requests to the same worker 240), the interconnect 210 permits only one request to be transmitted at a time on the crossbar 225. The interconnect 210 can include an arbiter to determine which request gets serviced first.

If the buffers 220 are first-in first-out (FIFOs), then if the request at the top of the FIFO is blocked by the arbiter, this blocks any other request in the buffers 220, even if those requests are for other workers 240 that would otherwise be able to be sent. To avoid this, the embodiments herein assign requests into groups and use separate group buffers to permit a request in one group to be transmitted on the crossbar 225 when a request for a different group may be blocked. This is described in FIG. 3.

FIG. 3 is a flowchart of a method 300 for assigning requests into groups, according to one embodiment. For clarity, the blocks in the method 300 are discussed in tandem with FIG. 4 which is a block diagram of a system for assigning requests into groups, according to one embodiment.

At block 305, a request buffer 220 receives a request from a controller (e.g., a controller 206 in FIG. 2). At block 310, this request is stored in the buffer 220. However, rather than using a vertical buffer (e.g., a FIFO), the buffer 220 is a horizontal buffer where each entry can be independently written to and read out from. That is, the requests may be stored in any order in the buffer 220, and read out in any order from the buffer 220. For instance, the buffer 220 may currently have pending requests saved at addresses 0, 1, 3-6, and 8, but not at addresses 2 and 7.

At block 315, a group classifier 410 identifies a group to which the request belongs. In one embodiment, the group classifier 410 uses the destination address in the request to identify its group. That is, before the method 400 has begun, the group assigner 201 may assign each destination address in the IC to a group. This will be discussed in more detail in FIG. 6.

In one embodiment, the group classifier 410 can identify the group of the request in parallel with storing the request in the request buffer 220.

At block 320, a location of the request in the request buffer 220 is stored in a group buffer 415. In one embodiment, the system includes a group buffer 415 for each group in the system. Thus, in addition to have a dedicated request buffer 220 for each controller, the IC can include a group buffer 415 for each group for each controller. In the example in FIG. 4, there are three group buffers 415 (e.g., three groups). However, the destinations in the IC can be divided into any number of groups, in which case each controller would have the same number of group buffers 415.

Once the group the request belongs to is identified, the system stores a location of the request in the request buffer 220 in the group buffer 415 for that group. For example, assume that the group classifier 410 determines that the request is in Group 0. The group classifier 410 can use that group ID to then select the group buffer 415 for Group 0. In addition, the group classifier 410 instructs the request buffer 220 to send the address of the request to the selected group buffer 415. As shown, the request buffer 220 includes multiple entries 405 which each have a unique address (e.g., address 0, 1, 2, etc.) in the buffer 220. If the request buffer 220 stored the request at address 2 (e.g., Entry 2), then address 2 is stored in the group buffer 415 for Group 0. That way, the group buffer 415 stores request buffer addresses 420 for reading the requests from the request buffer 220. Stated differently, each of the group buffers 415 stores request buffer addresses 420 for every request stored in the request buffer 220 that are assigned to the same group. For example, the group buffer 415 for Group 0 stores the addresses 420 for all the requests stored in the request buffer 220 assigned to Group 0, the group buffer 415 for Group 1 stores the addresses 420 for all the requests stored in the request buffer 220 assigned to Group 2, and so forth.

At block 325, the group buffer 415 indicates to the crossbar 225 that it has a request ready to be sent. That is, assuming the group buffer 415 is empty, once it receives a new address 420, it tells the crossbar 225 that it has a request ready to be sent.

Figure 4:
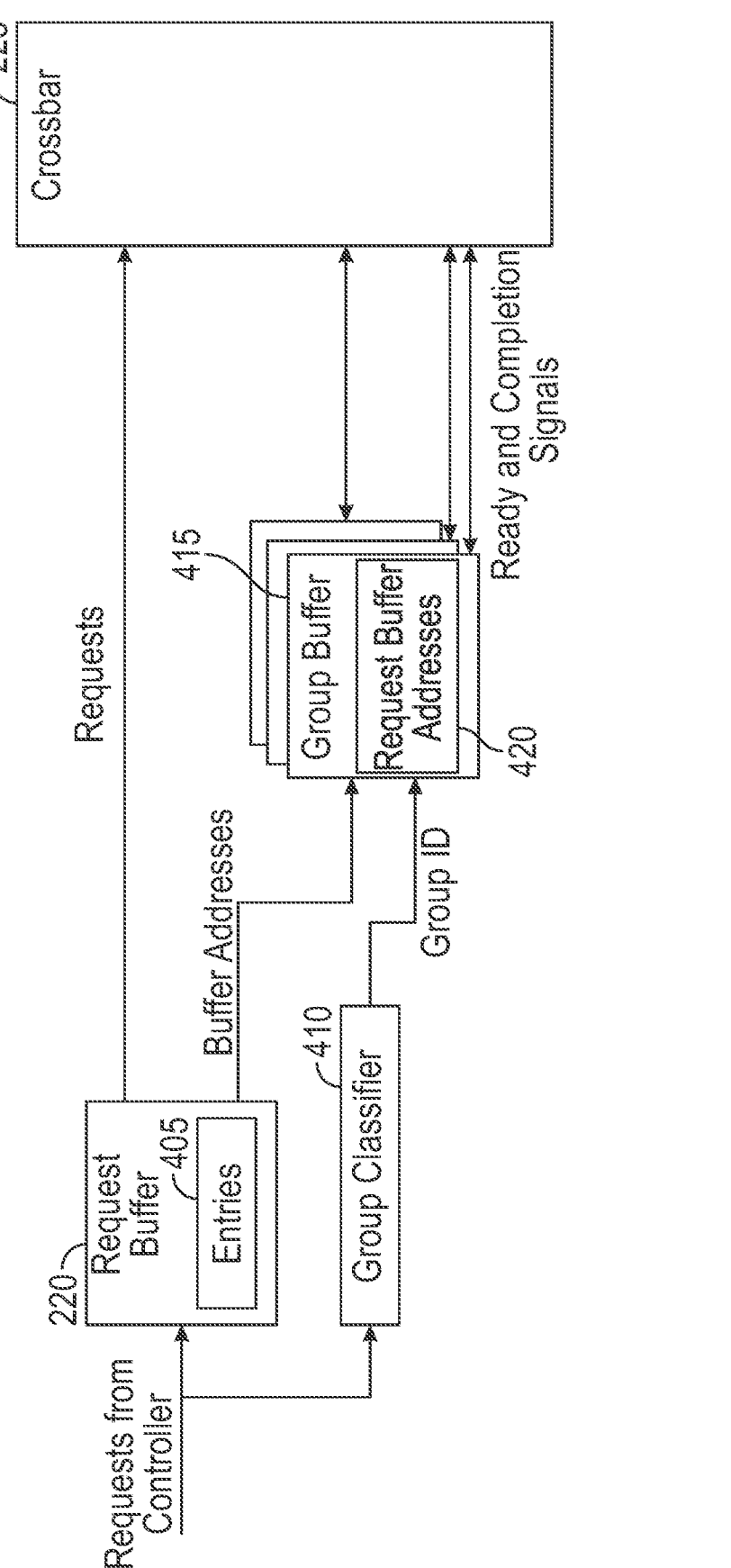
FIG. 4 is a block diagram of a system for assigning requests into groups, according to one embodiment.

As shown in FIG. 4, each of the group buffers 415 include a separate data path to the crossbar 225 (labeled "ready and completion signals"). Thus, each group buffer 415 can independently tell the crossbar 225 that it has a request ready to send. As such, if one group buffer 415 is blocked by an arbiter because the crossbar 225 is currently servicing a request from a different controller that is in the same group, another group buffer 415 that has a request can still inform the crossbar 225 and send the request, assuming the crossbar 225 is not currently sending a request for that group. Further, the group buffers 415 can transmit requests in parallel to the crossbar 225. Put differently, the crossbar 225 can route requests to different groups in parallel.

At block 330, if the crossbar 225 is not ready, then the method 300 waits until the arbiter determines it is the controller's turn. However, in the meantime, if requests for other groups are received, the group buffers 415 for those groups can inform the crossbar 225 and may be able to send those requests. The system in FIG. 4 represents a tradeoff where multiple controllers use a shared interconnect (e.g., a shared crossbar 225) to transmit request to multiple workers, but each controller has group buffers 415 that enable requests for one group to not be blocked by requests from other groups. At a hardware level, this includes adding the group classifier 410, the group buffers 415, and the separate data paths to the crossbar 225, but avoids having separate data paths from every controller to every single worker in the IC, which may be impossible.

Once the crossbar 225 signals to a group buffer 415 it is ready to service a request for one of the groups, at block 335, the system uses the location in the group buffer 415 to fetch the request from the request buffer 220 and forward the request to the crossbar 225. For instance, the system uses the request buffer address 420 stored in the group buffer 415 to retrieve the corresponding request from the correct entry 405 in the request buffer 220 and forward the request to the crossbar 225. Thus, the group buffers 415 do not have to store the entire request, but just the location of the request in the buffer 220 (i.e., the request buffer addresses 420). Further, unlike the request buffer 220, the group buffers 415 can be FIFO, but that is not a requirement.

Once a request has been serviced, the crossbar 225 can send a completion signal to the corresponding group buffer 415.

Figure 5:
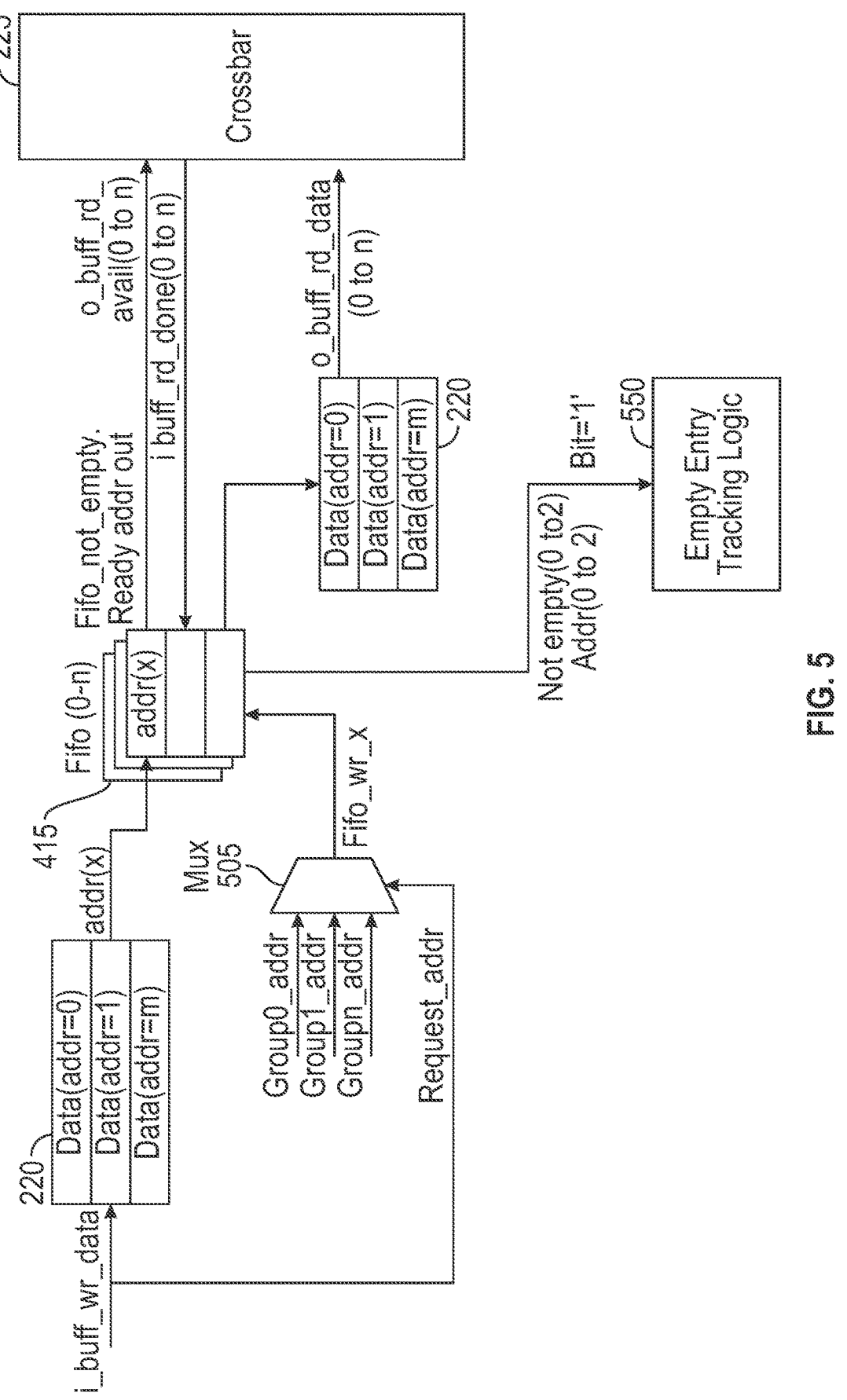
FIG. 5 illustrates circuitry for assigning requests into groups, according to one embodiment.

FIG. 5 illustrates circuitry for assigning requests into groups, according to one embodiment. FIG. 5 illustrates the request buffer 220 receiving a request (i.e., i_buff_wr_data) from a controller. In parallel with writing the request into the buffer 220, a multiplexer (mux) 505 uses the address in the request (i.e., request_addr) as a select signal to identify a group to which the request belongs (i.e., Group0_addr, Group1_addr, Groupn_addr). Thus, the mux 505 is one example circuit implementation of the group classifier 410 in FIG. 4.

The output of the mux 505 (i.e., Fifo_wr_x) is used to select one of the group buffers 415 (e.g., FIFOs). That is, the output of the mux 505 selects the group buffer 415 that is assigned to the same group as the received request. The address of the request in the request buffer 220 (i.e., addr(x)) is then written into the group buffer 415 for the request's group. Once the address is stored in the group buffer 415, the group buffer 415 informs the crossbar 225 that there is a request ready to be sent to a destination in the group (i.e., o_buff_rd_avail(0 to n)).

The crossbar 225 can signal when it is ready to send the request for that group. The addr(x) stored in the group buffer 415 is then used to index into the group buffer 220 to transmit the request to the crossbar 225 as shown by the signal o_buff_rd_data. Thus, while FIG. 5 illustrates two request buffers 220, they are actually the same buffer but represents two different times—i.e., when storing the request and when forwarding the request to the crossbar 225. The crossbar 225 can then signal the group buffer 415 when the request is complete (i.e., i_buff_rd_done(0 to n)).

FIG. 5 also illustrates empty entry tracking logic 550 which can include circuitry for tracking the empty and occupied entries in the request buffer 220. Because the requests can be stored in, and read out from, the request buffer 220 in any order, the empty entry tracking logic 550 can identify empty locations in the request buffer 220. In this embodiment, the logic 550 tracks the locations by receiving the addresses stored in the group buffers 415, but this is just one example for tracking the occupancy of the request buffer 220.

Figure 6:
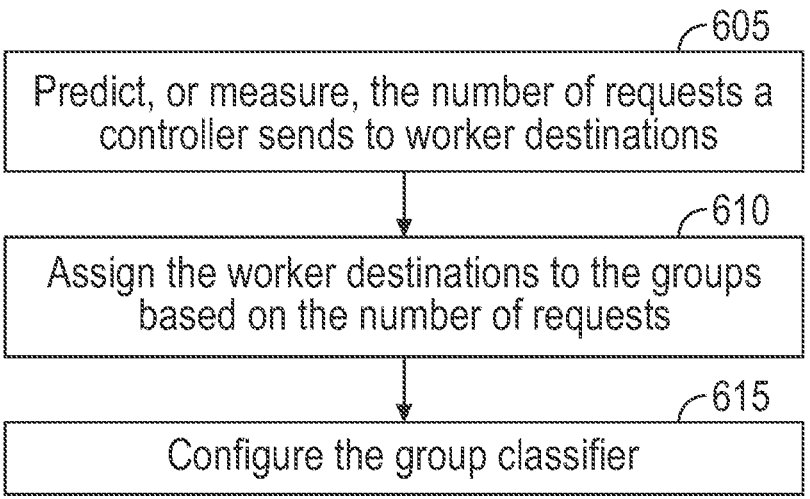
FIG. 6 is a flowchart for assigning destinations in an integrated circuits into groups, according to one embodiment.

FIG. 6 is a flowchart of a method 600 for assigning destinations in an integrated circuits into groups, according to one embodiment. In one embodiment, the method 600 may be performed by software (e.g., the group assigner 201) during boot up of the processor, or could be performed dynamically while the processor is running.

At block 605, the group assigner 201 predicts, or measures, the number of requests a controller sends to worker destinations. For example, some destinations may receive more requests than other destinations. Or some destinations may be higher priority than other destinations. Or some destinations may typically receive requests together—i.e., when a controller sends a request to Worker A, it also typically sends a request to Worker B.

At block 610, the group assigner 201 assigns the worker destinations to the group based on the number of requests identified at block 605. For example, worker destinations that receive more request, may be assigned to different groups to minimize the risk that they will block each other. For example, worker destinations that receive more requests may be assigned to smaller groups while worker destinations that receive fewer requests may be assigned to larger groups. Also, higher priority destinations may be given their own groups (e.g., a group of one). Moreover, if two worker destinations typically receive requests at the same time, they may be assigned to different groups so they do not block each other. These are just some of the different approaches to assigning the worker destinations into groups, and are not intended to be limiting.

At block 615, the group assigner 201 configures the group classifier. That is, the group assigner 201 can ensure that when a request is received, the group classifier for each controller can use the destination address in the request to identify the group that contains that request, as discussed in block 315 of FIG. 3.

While the foregoing is directed to embodiments of the present invention, other and further embodiments of the invention may be devised without departing from the basic scope thereof, and the scope thereof is determined by the claims that follow.

What is claimed is:

1. A method comprising:

receiving a request from a source circuit in an integrated circuit (IC) to be forwarded to a destination circuit in the IC, wherein the source circuit and the destination circuit are connected in the IC by a shared interconnect;

storing the request in a request buffer, wherein the request in the request buffer has a unique location and can be independently written to and read from;

identifying a group to which the request belongs based on a destination address in the request, wherein the IC comprises a plurality of destinations circuits coupled to the shared interconnect, wherein each of the plurality of destination circuits has a destination address and is assigned to one of a plurality of groups, and wherein the group is one of the plurality of groups;

storing, in a group buffer for the identified group, a location of the request in the request buffer;

indicating to the shared interconnect that the group buffer has a request ready to be sent to the identified group for the request; and after the shared interconnect is ready to transmit to the identified group, using the location of the request stored in the group buffer to fetch the request from the request buffer and forward the request to the shared interconnect.

2. The method of claim 1, wherein the IC comprises a plurality of source circuits that forward requests to the plurality of destination circuits, wherein each of the plurality of source circuits comprises one request buffer and a plurality of group buffers, wherein each of the plurality of group buffers corresponds to one of the plurality of groups.

3. The method of claim 2, wherein each of the plurality of group buffers has a separate data path to the shared interconnect so that each of the plurality of group buffers can indicate to the shared interconnect, in parallel with other group buffers, that it has a request ready to send.

4. The method of claim 3, wherein the plurality of group buffers and the plurality of groups are assigned to sets of non-overlapping destination circuits in the IC, wherein the shared interconnect can transmit requests to different ones of the plurality of groups in parallel.

5. The method of claim 2, wherein each of the plurality of group buffers is a first-in-first-out (FIFO).

6. The method of claim 1, wherein the shared interconnect is unable to send multiple requests assigned to a same group in parallel, but the shared interconnect can send requests assigned to different ones of the plurality of groups in parallel.

7. The method of claim 6, wherein the shared interconnect is a crossbar.

8. The method of claim 1, wherein the IC is a central processing unit (CPU).

9. The method of claim 1, wherein entries in the request buffer can be written into, and read from, in any order, the method further comprising:

tracking empty locations in the request buffer using the group buffer.

13

14

10. An integrated circuit (IC), comprising:

a plurality of source circuits;

a plurality of destination circuits;

a shared interconnect coupled to the plurality of source circuits and the plurality of destination circuits, wherein a first source circuit is configured to generate a request to be forwarded to a first destination circuit using the shared interconnect;

a request buffer configured to store the request before it is forwarded by the shared interconnect, wherein each request in the request buffer has a unique location and can be independently written to and read from;

a group classifier circuit configured to identify a group to which the request belongs based on a destination address in the request, wherein each of the plurality of destination circuits has a destination address and is assigned to one of a plurality of groups, and wherein the group is one of the plurality of groups; and a group buffer assigned to the group, the group buffer configured to store a location of the request in the request buffer and indicate to the shared interconnect that the group buffer has a request ready to be sent to the identified group for the request, wherein after the shared interconnect is ready to transmit to the identified group, the group buffer is configured to use the location of the request to fetch the request from the request buffer and forward the request to the shared interconnect.

11. The IC of claim 10, wherein each of the plurality of source circuits comprises one request buffer and a plurality of group buffers, wherein each of the plurality of group buffers corresponds to one of the plurality of groups.

12. The IC of claim 11, wherein each of the plurality of group buffers has a separate data path to the shared interconnect so each of the plurality of group buffers can indicate to the shared interconnect, in parallel with other group buffers, that it has a request ready to send.

13. The IC of claim 12, wherein the plurality of group buffers and the plurality of groups are assigned to sets of non-overlapping destination circuits in the IC, wherein the shared interconnect can transmit requests to different ones of the plurality of groups in parallel.

14. The IC of claim 11, wherein the plurality of group buffers of first-in-first-out (FIFOs).

15. The IC of claim 11, wherein the shared interconnect is unable to send multiple requests assigned to a same group in parallel, but the shared interconnect can send requests assigned to different ones of the plurality of groups in parallel.

16. The IC of claim 15, wherein the shared interconnect is a crossbar.

17. The IC of claim 10, wherein the IC is a CPU.

18. The IC of claim 10, wherein entries in the request buffer can be written into, and read from, in any order, the IC further comprising:

empty entry tracking logic configured to track empty locations in the request buffer using the group buffer.

19. An integrated circuit (IC), comprising:

a plurality of source circuits;

a plurality of destination circuits;

a shared interconnect coupled to the plurality of source circuits and the plurality of destination circuits, wherein each of the plurality of destination circuits has a destination address and is assigned to one of a plurality of groups;

a respective request buffer for each of the plurality of source circuits, the respective request buffers configured to store the respective requests before the requests are forwarded by the shared interconnect to the plurality of destination circuits, wherein each request in the request buffer has a unique location and can be independently written to and read from;

a respective group classifier circuit for each of the plurality of source circuits, the respective group classifier circuits configured to identify a group to which a request belongs based on a destination address in the request; and a plurality of group buffers coupled to the respective request buffer for each of the plurality of source circuits, wherein each one of the plurality of the group buffers is assigned to one of the plurality of groups, stores request data from the respective request buffer related only to its assigned group, and indicates to the shared interconnect that the group buffer has a request ready to be sent to the identified group for the request.

20. The IC of claim 19, wherein each of the plurality of group buffers has a separate data path to the shared interconnect so each of the plurality of group buffers can indicate to the shared interconnect, in parallel with other group buffers, that it has a request ready to send to the shared interconnect.

* * * * *